2,795,688

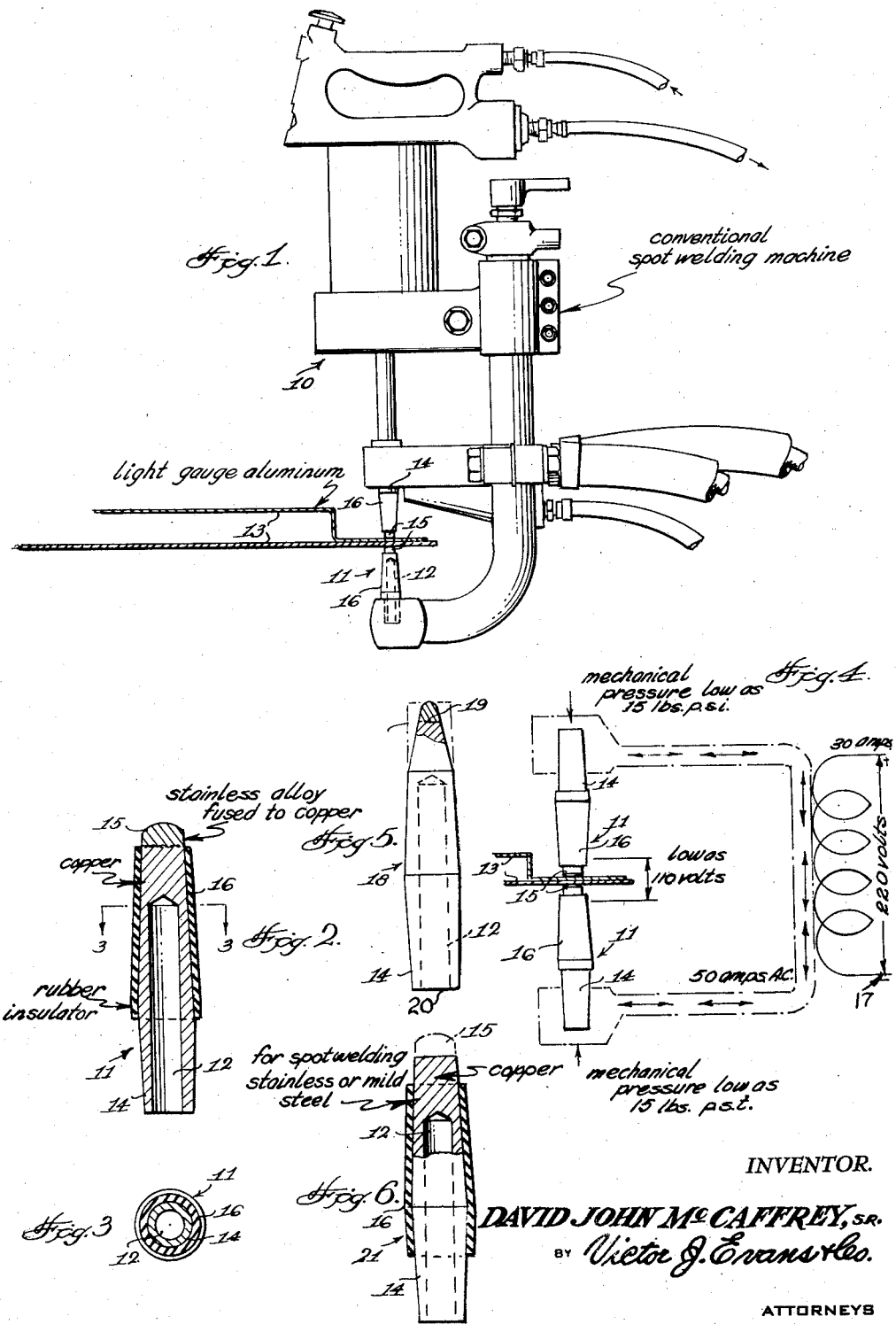

WELDING ELECTRODE TIP

David John McCaffrey, Sr., College Park, Md.

Application August 19, 1955, Serial No. 529,458

1 Claim. (Cl. 219—119)

This invention relates to the art of welding, and more particularly to an electrode for use in welding various materials such as aluminium.

The object of the invention is to provide a welding electrode which is especially suitable for use in welding light gauge aluminium or aluminium alloys, whereby the welding can be effected under low pressure and with a minimum amount of current or voltage.

Another object of the invention is to provide a method of forming an electrode for spot welding aluminium whereby a stainless steel tip is fused to a copper electrode to provide a member that is especially suitable for use in spot welding light gauge aluminium, or aluminium alloys.

A further object of the invention is to provide a welding electrode which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary elevational view illustrating a conventional spot welding machine using the electrodes of the present invention, and showing the aluminium work pieces in section.

Figure 2 is a longitudinal sectional view taken through one of the electrodes of the present invention.

Figure 3 is a sectional view taken on the line 3—3 of Figure 2.

Figure 4 is an elevational view illustrating schematically or diagrammatically the wiring diagram.

Figure 5 is an elevational view of a modified electrode, with parts broken away and in section.

Figure 6 is an elevational view of an electrode showing how the stainless steel tip may become worn away so as to leave the copper base which can be used for welding metals other than aluminium.

Referring in detail to the drawings, the numeral 10 designates a portion of a conventional spot welding machine which may be used for spot welding light gauge aluminium such as the aluminium 13, Figure 1. The present invention is directed to electrodes 11 which permit use of spot welding machine 10 of low voltage and low pressure whereby the welding of the aluminium can be readily carried out. The electrodes 11 may each include a body member or base 14 of copper, and the base 14 may be provided with a passageway 12 through which a cooling medium such as water may circulate.

Mounted on the outer end of each of the bases 14 is a tip 15 of stainless steel alloy. The stainless steel alloy 15 may be fused to the outer end of the base 14. A rubber sleeve 16 may be circumposed on each of the bases 14 as shown in Figures 2 and 3.

Referring to Figure 4 of the drawings, there is shown schematically how the electrodes 11 can be used for welding the aluminium 13, and the electrodes 11 may be supplied with current from the transformer 17. By means of the stainless steel tips 15, the mechanical pressure on the electrodes 11 may be very low and also the current from the transformer 17 may be much lower than is ordinarily required. Thus, the spot welding of the aluminium can be carried out easily and economically without any costly equipment.

Referring to Figure 5 of the drawings there is shown a modified electrode which is indicated generally by the numeral 18. The electrode 18 may include a copper base 20 which has a stainless steel tip 19 fused thereto, and the tip 19 may have a somewhat pointed shape which can be formed by grinding down the tip by any tool.

Referring to Figure 6 of the drawings, the numeral 21 designates an electrode which may result after the stainless steel tip 15 wears away. Thus, the electrode 21 may consist of the base 14 which has the sleeve 16 thereon, and with the stainless steel tip 15 worn away or removed, the electrode 21 can be used in the same manner as an ordinary electrode for spot welding metal other than aluminium.

In use, the electrodes 11 may have any desired size and shape, and the spot welder 10 may be of any desired type. The electrodes 11 are mounted in the spot welding machine 10 and then with a small amount of current and with a minimum of mechanical pressure on the electrodes 11, aluminium such as the aluminium 13 can be spot welded. Due to the provision of the stainless steel tips 15 which are fused on the outer ends of the base 14, the aluminium can be readily welded. With electrodes that do not have the stainless steel tips, heretofore it has not been possible to use low cost welding machines for spot welding aluminium.

The tip 15 may be fused to the end of the electrode by a suitable heating medium, and a suitable skirt or quantity of argon gas may be used to surround the parts when they are being fused together, so as to prevent impurities from affecting the finished article.

With the present invention, various types of spot welding machines such as portable spot welding machines can be used to weld light gauge aluminium and alloys. When the stainless steel alloy tips 15 become worn off from shaping or cleaning as shown in Figure 6, the electrodes can be used as conventional tips for spot welding mild steel or stainless steel. The machine 10 may be of any conventional type and may or may not be water cooled. With the parts as shown in Figure 4, the mechanical pressure on the electrodes 11 may be as low as fifteen pounds per square inch, and the voltage may be as low as 110 volts and the current may be 50 amps.

It is to be of course understood that the present invention is only in the electrode and that the present invention is not limited to any particular type of spot welding machine.

When the electrodes are being formed, the copper base 14 may be held in a jig or between any suitable gripping members, and then the outer end of the base is made molten in any suitable manner, and then the stainless steel tip 15 is added to the copper base to a desired depth. With the present invention inexpensive spot welding machines can be used for spot welding aluminium due to the provision of the stainless steel tips. After the tip wears off it can be used as a conventional electrode, or else a new tip can be fused thereon. The rubber sleeve 16 acts as an insulator. Thus, there has been provided a method of spot welding aluminium between the electrodes of a spot welding machine wherein the tips are of high conductive material. After the tips have been fused on the copper, they may be ground to the desired shape and size. The rubber sleeve serves as an insulator and thus prevents shorting out of the parts. This rubber may come in liquid form and may harden after being applied, the rubber being heat resistant, that is the rubber will not be affected by heat.

I claim:

A welding electrode for use with a spot welding machine of low voltage and low pressure, comprising a base, a tip on the outer end of said base, said base being made of copper, said tip and base being fused together, said electrode adapted to be used for welding aluminium, said base having a passageway therein for the passage therethrough of a cooling medium, said passageway extending from an end of said base to a point spaced from the other end thereof, said tip being made of stainless steel so that the mechanical pressure on the electrode may be very low and also the current in the transformer may be much lower than is ordinarily required whereby the spot welding of aluminium can be carried out easily and economically without any costly equipment and whereby when the stainless tip is worn away or removed, the electrodes can be used in the same manner as an ordinary electrode for spot welding metal other than aluminium.

References Cited in the file of this patent

UNITED STATES PATENTS

| | | |
|---|---|---|
| 1,300,068 | Weed | Apr. 8, 1919 |
| 1,568,080 | Meadowcroft | Jan. 5, 1926 |
| 1,992,990 | Burns | Mar. 5, 1935 |
| 2,446,932 | Johnson | Aug. 10, 1948 |

FOREIGN PATENTS

| | | |
|---|---|---|
| 572,662 | Germany | Mar. 20, 1933 |